United States Patent
Lu et al.

(10) Patent No.: US 8,317,360 B2
(45) Date of Patent: Nov. 27, 2012

(54) LIGHTING SYSTEM COVER INCLUDING AR-COATED TEXTURED GLASS, AND METHOD OF MAKING THE SAME

(75) Inventors: Yiwei Lu, Ann Arbor, MI (US); Jim St. Jean, Canton, MI (US); Nathan P. Mellott, Northville, MI (US); Zhongming Wang, Ypsilanti, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 268 days.

(21) Appl. No.: 12/232,539

(22) Filed: Sep. 18, 2008

(65) Prior Publication Data
US 2010/0067223 A1 Mar. 18, 2010

(51) Int. Cl.
F21V 3/00 (2006.01)
F21V 5/00 (2006.01)

(52) U.S. Cl. .............. 362/235; 362/311.02; 362/311.05; 362/330

(58) Field of Classification Search .................. 362/235, 362/615–627, 339, 330, 293, 236, 237, 257, 362/311.02, 311.05, 317; 359/599; 445/58
See application file for complete search history.

(56) References Cited

U.S. PATENT DOCUMENTS

| | | | | |
|---|---|---|---|---|
| 3,738,656 A * | 6/1973 | Rockwood et al. | ............. | 473/64 |
| 4,173,778 A * | 11/1979 | Snavely et al. | ............... | 362/297 |
| 4,345,308 A * | 8/1982 | Mouyard et al. | ............... | 362/332 |
| 4,486,070 A * | 12/1984 | Benton | ......................... | 359/627 |
| 5,005,108 A * | 4/1991 | Pristash et al. | ................ | 362/602 |
| 6,356,389 B1 * | 3/2002 | Nilsen et al. | .................... | 359/625 |
| 6,570,710 B1 * | 5/2003 | Nilsen et al. | .................... | 359/625 |
| 6,698,121 B2 * | 3/2004 | Wardle et al. | ................... | 40/452 |
| 6,752,505 B2 * | 6/2004 | Parker et al. | .................. | 362/627 |
| 6,827,456 B2 * | 12/2004 | Parker et al. | .................. | 362/330 |
| 7,466,484 B2 * | 12/2008 | Mi et al. | ........................ | 362/606 |
| 7,566,158 B2 * | 7/2009 | Soh et al. | ...................... | 362/607 |
| 7,997,771 B2 * | 8/2011 | Epstein et al. | ................ | 362/339 |
| 2002/0181224 A1 * | 12/2002 | Tahara et al. | ................... | 362/31 |
| 2004/0105248 A1 * | 6/2004 | Yu et al. | .......................... | 362/31 |
| 2005/0068617 A1 * | 3/2005 | Mizuno et al. | ................ | 359/443 |

(Continued)

FOREIGN PATENT DOCUMENTS
DE 101 41 219 3/2003
(Continued)

OTHER PUBLICATIONS

International Search Report dated Jan. 27, 2010.

*Primary Examiner* — Alan Cariaso
(74) *Attorney, Agent, or Firm* — Nixon & Vanderhye P.C.

(57) ABSTRACT

Certain examples relate to lighting system covers that include AR-coated textured glass, and/or methods of making the same. In certain examples, at least one light source is provided proximate to a cover comprising a glass substrate. The glass substrate includes an anti-reflective (AR) coating on the surface that is closer to the at least one light source, and the glass substrate is textured (e.g., such that it is substantially prismatic in texture) on the surface opposite the AR-coated surface. The surface of the glass substrate on which the AR coating is formed may be a flat, irregular, or textured matte. An optional AR coating also may be formed on the textured surface of the glass substrate.

18 Claims, 3 Drawing Sheets

U.S. PATENT DOCUMENTS

2005/0264160 A1 12/2005 Lee et al.
2006/0210783 A1 9/2006 Seder et al.
2007/0113881 A1 5/2007 Mellott et al.
2008/0072956 A1 3/2008 Sharma et al.

FOREIGN PATENT DOCUMENTS

WO WO 02/064518 8/2002
WO WO 2006/097859 9/2006
WO WO 2009/038250 3/2009

* cited by examiner

LIGHTING SYSTEM COVER INCLUDING AR-COATED TEXTURED GLASS, AND METHOD OF MAKING THE SAME

FIELD OF THE INVENTION

Certain example embodiments of this invention relate to lighting system covers and/or methods of making the same. More particularly, certain example embodiments relate to lighting system covers that include AR-coated textured glass, and/or methods of making the same. In certain example embodiments, at least one light source is provided proximate to a cover comprising a glass substrate. The glass substrate includes an anti-reflective (AR) coating on the surface that is closer to the at least one light source, and the glass substrate is textured (e.g., such that it is substantially prismatic in texture) on the surface opposite the AR-coated surface. The surface of the glass substrate on which the AR coating is formed may be a flat or irregular matte. An optional AR coating also may be formed on the textured surface of the glass substrate. Advantageously, the lighting systems of certain example embodiments may increase percent transmission, transmission intensity, and/or intensity distribution along viewing angles, while also or alternatively reducing the number of light sources required to achieved a desired luminance in a defined area, and/or reducing operational costs through reduced electricity requirements and extended lamp life.

BACKGROUND AND SUMMARY OF EXAMPLE EMBODIMENTS OF THE INVENTION

Lighting systems are known. Conventional lighting systems include at least one light source located behind a cover comprising a glass substrate, such that the cover at least partially shields the at least one light source from the viewer. Typically, most of the light from the at least one light source therefore passes through the glass substrate.

Although such conventional lighting systems have been used successfully for years, further improvements are still possible. For example, when light from the at least one light source hits the glass substrate, some of the incident light reflects and thus does not pass through the glass substrate. The reflection reduces transmission and transmission intensity. Similarly, the intensity distribution along differing viewing angles can vary. Thus, it often is the case that more light sources are required to achieve the desired luminance in a defined area when a cover is used compared to when no cover is used at all. The increased number of light sources, in turn, leads to higher operational costs, e.g., by requiring additional electricity and lowering lamp life.

Thus, it will be appreciated that there is a need in the art for improved lighting systems, and/or methods of making the same, that overcome one or more of these and/or other disadvantages.

In certain example embodiments of this invention, a lighting system is provided. A glass cover is provided. The glass cover comprises a first anti-reflective (AR) coating provided directly or indirectly on a first major surface of the glass cover. A second major surface of the glass cover is textured, with the second major surface being opposite the first major surface. The glass cover is arranged such that the first major surface thereof would be closer than the second major surface to any light source(s) used in connection with the lighting system.

In certain example embodiments, a lighting system is provided. At least one light source is provided. A glass cover comprises a first anti-reflective (AR) coating provided directly or indirectly on a first major surface of the glass cover. The first major surface is either a substantially flat matte or an irregular matte. A second major surface of the glass cover is textured so that the second major surface is substantially prismatic when viewed in cross-section, with the second major surface being opposite the first major surface. The glass cover is arranged such that the first major surface thereof is closer to the at least one light source than the second major surface. The first AR coating provided on the first major surface of the glass cover and the textured second surface of the cover glass cooperate to increase radiation transmitted from the at least one light source by at least about 2.5%.

In certain example embodiments, a method of making a lighting system is provided. A glass cover is provided. A first anti-reflective (AR) coating is formed directly or indirectly on a first major surface of the glass cover, with the first major surface being either a substantially flat matte or an irregular matte. A second major surface of the glass cover is textured so that the second major surface is substantially prismatic when viewed in cross-section, with the second major surface being opposite the first major surface. The glass cover is arranged such that the first major surface thereof would be closer than the second major surface to any light source(s) used in connection with the lighting system. The first AR coating provided on the first major surface of the glass cover and the textured second surface of the cover glass cooperate to increase radiation transmitted from the at least one light source by at least about 2.5%.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
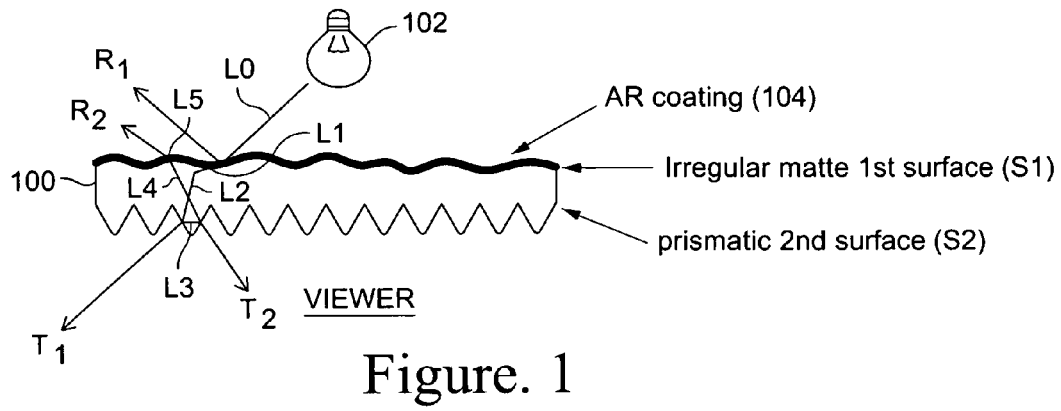
FIG. 1 is a light system cover in accordance with an example embodiment.

Referring now more particularly to the accompanying drawings in which like reference numerals indicate like parts/layers throughout the several views.

In certain example embodiments, a lighting system cover includes an AR-coated textured glass substrate. More particularly, at least one light source is provided proximate to a cover comprising a glass substrate. The glass substrate includes an anti-reflective (AR) coating on the surface that is closer to the at least one light source, and the glass substrate is textured (e.g., such that it is substantially prismatic in texture) on the surface opposite the AR-coated surface. The surface of the glass substrate on which the AR coating is formed may be a flat or irregular matte. An optional AR coating also may be formed on the textured surface of the glass substrate. Advantageously, the lighting systems of certain example embodiments may increase percent transmission, transmission intensity, and/or intensity distribution along viewing angles, while also or alternatively reducing the number of light sources required to achieved a desired luminance in a defined area, and/or reducing operational costs through reduced electricity requirements and extended lamp life.

FIG. 1 is a lighting system cover in accordance with an example embodiment. Similar to conventional lighting systems, the example embodiment shown in FIG. 1 includes a glass substrate 100 located between at least one light source 102 and the viewer. Unlike a conventional lighting system, however, the substrate 100 includes an anti-reflective (AR) coating 104 applied to a first surface S1 only or to both the first surface S1 and a textured second surface S2. The first surface S1 is closer to the at least light source 102, whereas the second surface S2 is closer to the viewer. Although the first surface S1 shown in FIG. 1 is an irregular matte, in certain example embodiments the first surface S1 may be a substantially flat matte or textured.

The AR coating 104 applied to the first surface S1 of the substrate 100 may be a low-index AR coating. For example, in certain example embodiments, the AR coating 104 may have a refractive index of about 1.20-1.45, more preferably 1.25-1.40, still more preferably 1.30-1.35, at or around the 550 nm wavelength of light. In certain example embodiments, the AR coating 104 may have a physical thickness of about 100-200 nm. In certain example embodiments, the AR coating 104 may be a single-layer anti-reflective (SLAR) coating or a multi-layer anti-reflective (MLAR) coating. In certain example embodiments, the AR coating 104 may comprise silicon oxide (e.g., $SiO_2$ or other suitable stoichiometry), or any other suitable metal oxide or non-metal oxide material having the desired anti-reflective properties. Such AR coatings may be formed on the substrate by any suitable means including, for example, via sol-gel, dip coating, spray or flame pyrolysis, chemical vapor deposition (CVD), combustion chemical vapor deposition (CCVD), sputtering, and/or other like processes. For example, one type of AR coating is described in application Ser. No. 11/083,074, the entire contents of which is hereby incorporated herein by reference. Another example AR coating that may be used in connection with certain example embodiments is formed by wet-applying silicon oxide from a solution (e.g., via a wet, spray process) to the desired surface(s) of the glass substrate and then baking the coated glass substrate to form the coating comprising porous silica. The porous silica AR coating has been found to have an index of refraction of about 1.31-1.33. In connection with certain example embodiments, other AR coatings may be the same as or similar to those used in solar cell applications including, for example, those described in U.S. application Ser. Nos. 11/514,320 and 11/516,671, the entire contents of each of which are hereby incorporated herein by reference.

As noted above, the second surface S2 is a textured surface. In certain example embodiments, the second surface S2 may be a prismatic surface. For example, the second surface S2 may be textured such that, when viewed in cross-section, it may appear to have substantially triangular downward protrusions and/or appear to have a saw-tooth like shape. In certain example embodiments, the second surface S2 of the substrate 100 may be textured by pressing (e.g., roller pressing), chemical etching, laser etching, or other like texturing techniques.

As described above, when light from at least one light source hits the glass substrate in a conventional lighting system, much of the incident light reflects and thus does not pass through the glass substrate, leading to a number of disadvantages. For example, light $L_0$ emanates from the at least one light source 102. A portion of that light $L_0$ is still reflected off of the AR coating 104. However, the AR coating 104 on the first surface S1 of the substrate 100 helps reduce reflection $R_1$ and also increases transmission of the light. Some of the light passing through the AR coating 104 is refracted along line $L_1$. This light is then refracted somewhat along line $L_2$ when it contacts the first surface S1 of the glass substrate.

The prismatic textured second surface S2 of the substrate 100 also helps to reduce reflection of the light off of the second surface S2 of the glass substrate 100 and thus also enhances transmitted light $T_1$ and $T_2$, especially at increased viewing angles (e.g., viewing angles greater than 45 degrees). For example, transmitted light $T_1$ and $T_2$, are enhanced both in terms of uniformity and overall intensity of transmitted light along different viewing angles. Continuing with the example shown in FIG. 1, much of the light along $L_2$ will be transmitted as $T_1$, although some will be refracted along $L_3$. Once the light along line $L_3$ comes into contact with another portion of the prismatic textured second surface S2 of the substrate 100, much of the same will be transmitted as $T_2$, and only some of it will be reflected back toward the at least one light source 102 along line $L_4$. The light reflected back toward the at least one light source 102 along line $L_4$ ultimately will be refracted along line $L_5$ when it comes into contact with the first surface S1 of the substrate 100 and will be refracted once again along line $R_2$ once it passes through the AR coating 104.

Optionally, in certain example embodiments, the same or a different AR coating as that provided as AR coating 104 may be applied on the second surface S2 of the substrate 100. Advantageously, this might also help to reduce $R_2$ and increase $T_1$ and $T_2$ yet further.

In certain example embodiments, a method of making a lighting system is provided. A glass cover is provided. A first anti-reflective (AR) coating is formed directly or indirectly on a first major surface of the glass cover, with the first major surface being either a substantially flat matte or an irregular matte. A second major surface of the glass cover is textured so that the second major surface is substantially prismatic when viewed in cross-section, with the second major surface being opposite the first major surface. The glass cover is arranged such that the first major surface thereof would be closer than the second major surface to any light source(s) used in connection with the lighting system. The first AR coating provided on the first major surface of the glass cover and the textured second surface of the cover glass cooperate to increase radiation transmitted from the at least one light source by at least about 2.5%. When both major surfaces of the cover glass are coated, radiation transmitted from the at least one light source may be increased by at least about 4.5%.

Figure 2:
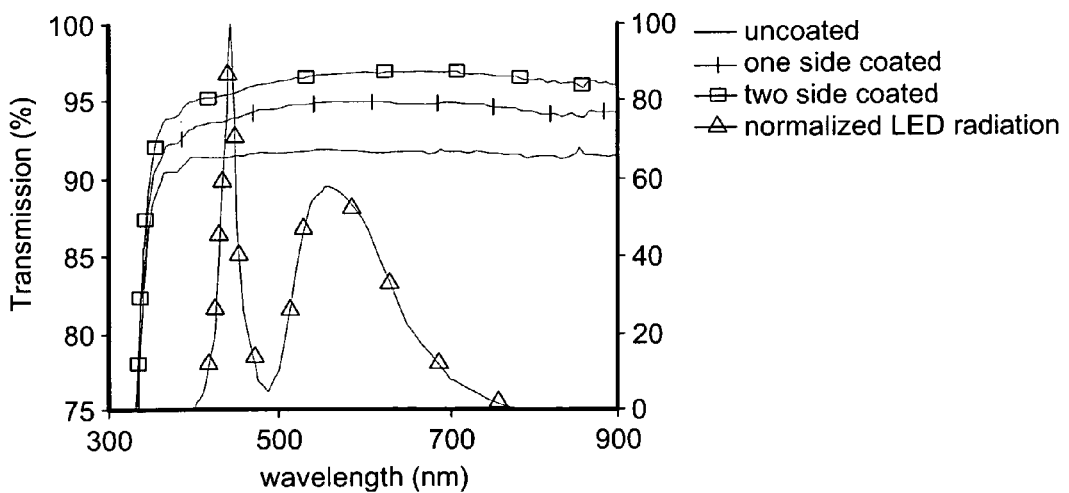
FIG. 2 is a graph showing measured percent transmission of coated and uncoated textured glass substrates in accordance with an example embodiment, as well as normalized white LED light.

FIG. 2 is a graph showing measured percent transmission of coated and uncoated textured glass substrates in accordance with an example embodiment, as well as normalized white LED light. More particularly, FIG. 2 shows the measured transmission from a 3 mm thick textured low iron soda lime glass substrate, with and without AR coatings. The radiation of a white light LED typically used in conventional lighting systems is shown for reference. As will be appreciated from FIG. 2, the AR coating of certain example embodiments can increase the transmitted radiation from the white light LED at least about 2.5% (or 2.5 percentage points) when applied to the first surface only, and at least about 4.5% (or 4.5 percentage points), or even more, when applied to both surfaces. Similar improvements are observable in connection with lighting systems that use fluorescent and/or incandescent lamp(s).

Figure 3:
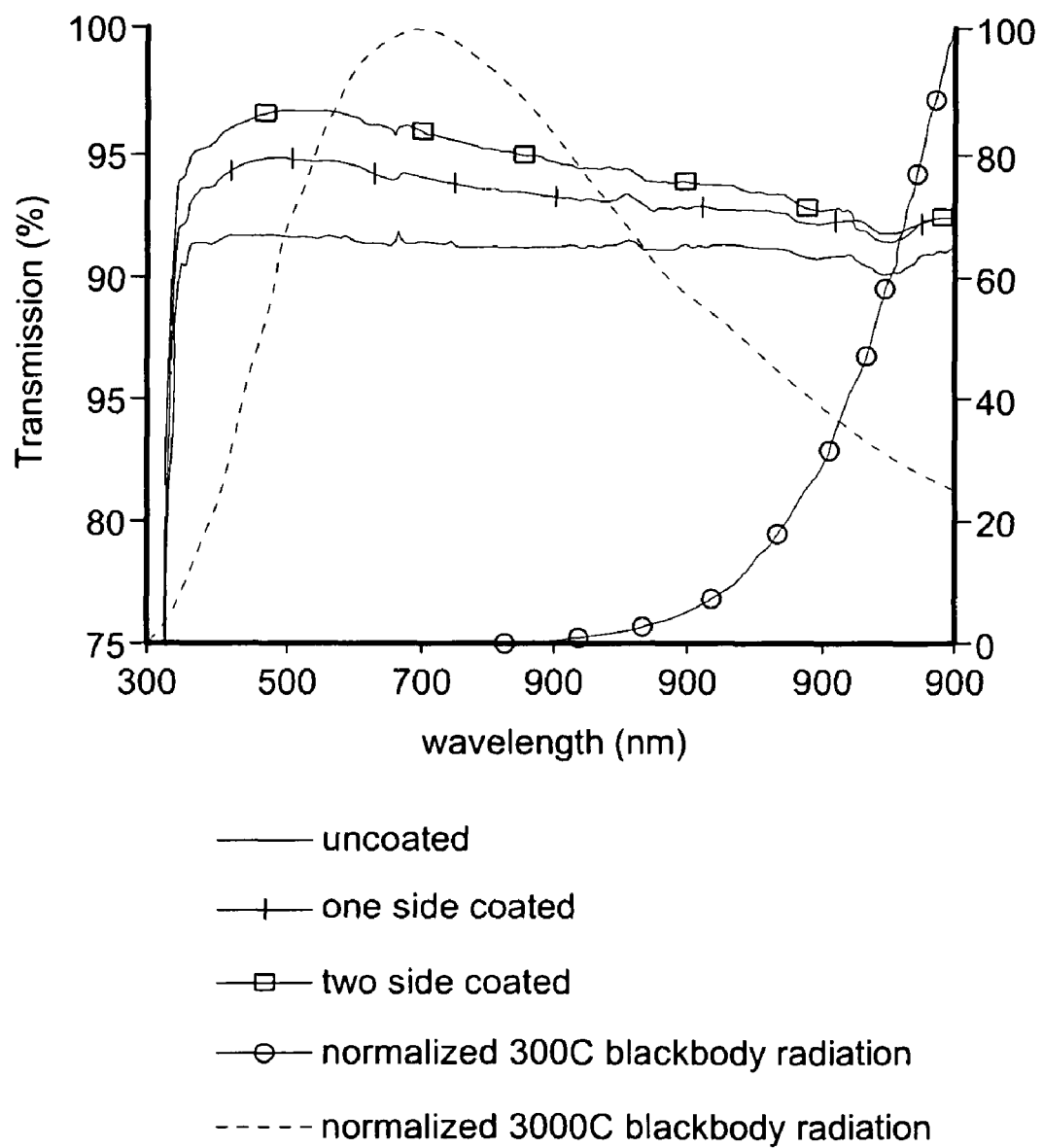
FIG. 3 is a graph showing measured percent transmission of coat and uncoated textured glass substrates in accordance with an example embodiment, as well as measured black body radiation from 300 degree C. and 3000 degree C. sources.

FIG. 3 is a graph showing measured percent transmission of coat and uncoated textured glass substrates in accordance with an example embodiment, as well as measured black body radiation from 300 degree C. and 3000 degree C. sources. That is, FIG. 3 shows the measured transmission spectra from a textured low iron soda lime glass substrate, with and without an AR coating. Black body radiation was simulated. "Black body radiation" refers to an object or system that absorbs all incident radiation, and re-radiates energy that is characteristic of this radiating object or system only and thus is not dependent on the type of incident radiation incident. The simulated black body radiation from both 300 degrees C. and 3000 degrees C. sources indicate that the "broadband" AR coating of certain example embodiments also may reduce lamp housing temperatures by allowing more heat to radiate through the glass. In other words, the AR coating may reduce the reflection of visible and/or non-visible light, e.g., such that visible transmission is increased and such that more of the heat produced by the at least one light source provided for use with the lighting system passes through the cover glass and away from the at least one light source.

Figure 4:
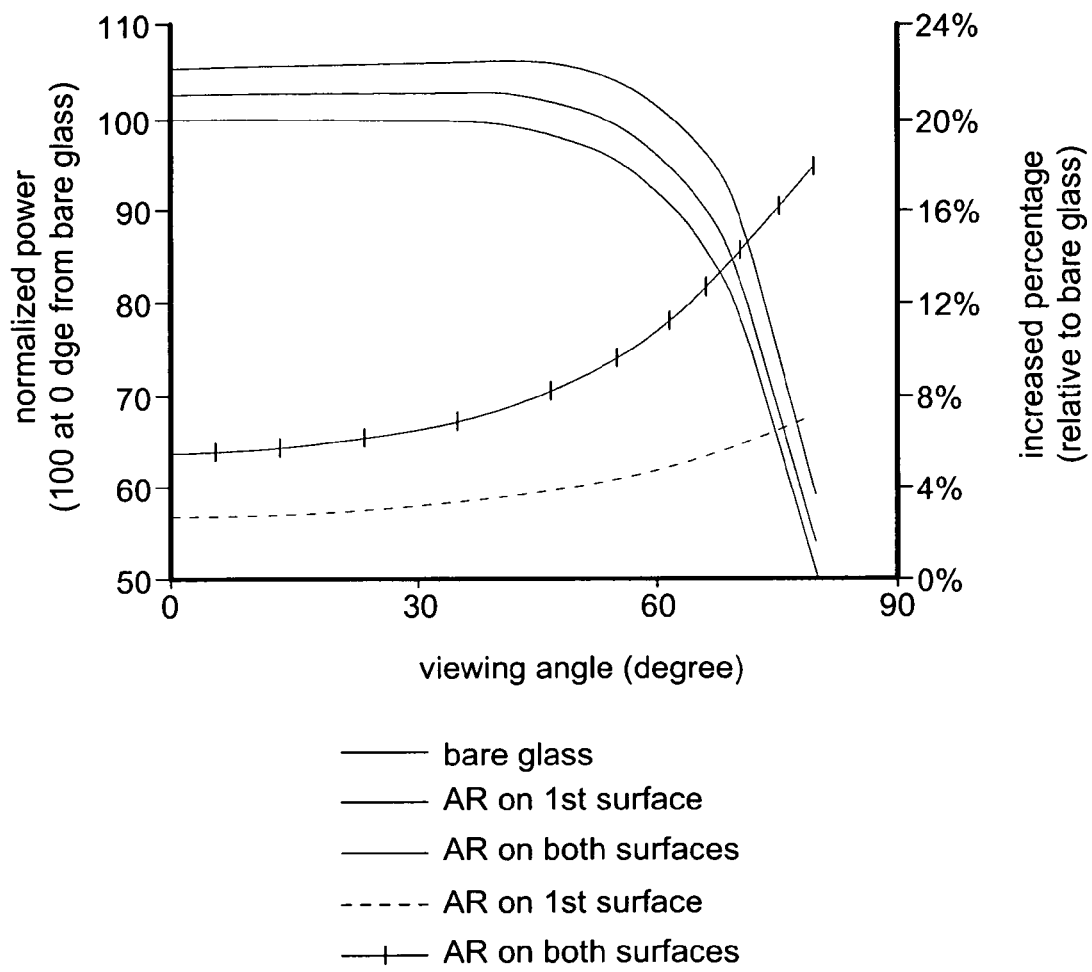
FIG. 4 is a graph showing simulated transmission power at different viewing angles from an LED lighting system having a flat, non-textured glass substrate, with and without AR coatings, in accordance with an example embodiment.

FIG. 4 is a graph showing simulated transmission power at different viewing angles from an LED lighting system having a flat, non-textured glass substrate, with and without AR coatings, in accordance with an example embodiment. That is, FIG. 4 shows the simulated transmission power at different viewing angles for an LED lighting system having a flat, non-textured soda lime glass substrate, with and without AR coatings. As can be appreciated from FIG. 4, the low-index coated soda lime glass substrate has a wider and more uniform intensity distribution along viewing angles. The uniformity may be further improved when a textured soda lime glass substrate is used. For example, the increased power percentage (relative to bare glass) may be at least about 3% at substantially all viewing angles between 0 and 90 degrees for embodiments with a single coated surface, whereas the increased power percentage (relative to bare glass) may be at least about 5% at substantially all viewing angles between 0 and 90 degrees for embodiments where both surfaces are coated with an AR coating. It will be appreciated that the relative power increases themselves increase as the viewing angles increase.

While the materials shown for the various layers in the drawings are preferred materials in certain example embodiments of this invention, they are not intended to be limited unless expressly claimed. Other materials may be used to replace materials shown in the drawings in alternative example embodiments of this invention. Moreover, certain layers may be removed, and other layers added, in alternative embodiments of this invention. Likewise, the illustrated thicknesses also are not intended to be limiting unless expressly claimed.

As noted above, certain example embodiments may be used in connection with one or more LED lights. In this regard, for instance, certain example embodiments described herein may be used in connection with large indoor and/or outdoor displays, e.g., of the type typically found at sports venues (including stadiums, arenas, and the like) or other large public places (e.g., outside of buildings, in large public squares such as Times Square in New York, etc.). Of course, as noted above, the example embodiments described herein may be used in connection with any type of light source (including, for example, incandescent, fluorescent, and/or other light sources), and thus may be applied to a wide variety of different applications.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A light emitting diode (LED) lighting system comprising a plurality of light emitting diodes (LEDs), the LED lighting system billboard comprising:
   a single glass substrate disposed over the plurality of LEDs, the glass substrate comprising a first anti-reflective (AR) coating provided directly or indirectly on a first major surface of the glass substrate,
   wherein a second major surface of the glass substrate is prismatically textured to increase transmission of light at viewing angles greater than about 45 degrees from normal, the second major surface being opposite the first major surface,
   wherein the glass substrate is arranged such that the first major surface thereof is closer than the second major surface to the plurality of LEDs of the LED lighting system.

2. The LED lighting system of claim 1, wherein the first major surface of the glass substrate is substantially flat.

3. The LED lighting system of claim 1, wherein the first major surface of the glass substrate is an irregular matte.

4. The LED lighting system of claim 1, further comprising a second AR coating directly or indirectly applied to the second major surface.

5. The LED lighting system of claim 4, wherein the first and second AR coatings are the same.

6. The LED lighting system of claim 4, wherein the lighting system increases radiation transmitted from the plurality of LEDs used in the LED lighting system by at least about 4.5%.

7. The LED lighting system of claim 1, wherein the first AR coating has a refractive index of about 1.30-1.35 at 550 nm.

8. The LED lighting system of claim 1, wherein the first AR coating has a physical thickness of about 100-200 nm.

9. The LED lighting system of claim 1, wherein the lighting system increases radiation transmitted from the plurality of LEDs used in the LED lighting system by at least about 2.5%.

10. A lighting system comprising a plurality of light emitting diodes (LEDs, the light system comprising:
    a glass substrate, the glass substrate comprising a first anti-reflective (AR) coating provided directly or indirectly on a first major surface of the glass substrate, the first major surface being either a substantially flat matte or an irregular matte,
    wherein a second major surface of the glass substrate is prismatically textured to increase transmission of light at viewing angles greater than about 45 degrees from normal, the second major surface being opposite the first major surface, and wherein a second AR coating directly or indirectly applied to the second major surface,
    wherein the glass substrate is arranged such that the first major surface thereof is closer to the plurality of LEDs than the second major surface, and
    wherein the first AR coating provided on the first major surface of the glass substrate and the textured second surface of the glass substrate cooperate to increase radiation transmitted from the plurality of LEDs by at least about 2.5%.

11. The lighting system of claim 10, further comprising a second AR coating directly or indirectly applied to the second major surface.

12. The lighting system of claim 11, wherein the first and second AR coatings are the same.

13. The lighting system of claim 11, wherein the textured second surface of the glass substrate cooperate to increase radiation transmitted from the plurality of LEDs by at least about 4.5%.

14. The lighting system of claim 10, wherein the first AR coating has a refractive index of about 1.30-1.35 at 550 nm.

15. The lighting system of claim 10, wherein the first AR coating has a physical thickness of about 100-200 nm.

16. A method of making a light emitting diode (LED) lighting system comprising a plurality of light emitting diodes (LEDs), comprising:

forming a first anti-reflective (AR) coating directly or indirectly on a first major surface of a glass substrate, the first major surface being either a substantially flat matte or an irregular matte;

texturing a second major surface of the glass substrate so that the second major surface is prismatically textured to increase transmission of light at angles greater than about 45 degrees from normal, the second major surface being opposite the first major surface;

forming a second AR coating directly or indirectly on the second major surface; and arranging the glass substrate such that the first major surface thereof is closer than the second major surface to the plurality of LEDs, wherein the first AR coating provided on the first major surface of the glass substrate and the textured second surface of the glass substrate cooperate to increase radiation transmitted from the plurality of LEDs in the (LED) lighting system by at least about 2.5%.

17. The method of claim 16, wherein the first AR coating provided on the first major surface of the glass substrate, the second AR coating provided on the second major surface of the glass substrate, and the textured second surface of the glass substrate cooperate to increase radiation transmitted from the plurality of LEDs in the (LED) lighting system at least one light source by at least about 4.5%.

18. The method of claim 16, wherein the first AR coating has a refractive index of about 1.30-1.35 at 550 nm has a physical thickness of about 100-200 nm.

* * * * *